(12) United States Patent
Krugman

(10) Patent No.: US 12,506,861 B2
(45) Date of Patent: Dec. 23, 2025

(54) COLOR REFERENCE PATTERN FOR CHROMINANCE EVALUATION IN IMAGES

(71) Applicant: Datacolor, Inc., Lawrenceville, NJ (US)

(72) Inventor: Casey Krugman, Lawrence Township, NJ (US)

(73) Assignee: Datacolor, Inc., Lawrenceville, NJ (US)

(*) Notice: Subject to any disclaimer, the term of this patent is extended or adjusted under 35 U.S.C. 154(b) by 368 days.

(21) Appl. No.: 18/193,599

(22) Filed: Mar. 30, 2023

(65) Prior Publication Data

US 2024/0333910 A1    Oct. 3, 2024

(51) Int. Cl.
*G06T 7/90* (2017.01)
*H04N 17/02* (2006.01)

(52) U.S. Cl.
CPC .............. *H04N 17/02* (2013.01); *G06T 7/90* (2017.01); *G06T 2207/10016* (2013.01); *G06T 2207/10024* (2013.01)

(58) Field of Classification Search
CPC . H04N 17/02; G06T 7/90; G06T 2207/10016; G06T 2207/10024
USPC ........................................................ 382/162
See application file for complete search history.

(56) References Cited

U.S. PATENT DOCUMENTS

| | | | | |
|---|---|---|---|---|
| 5,122,863 A * | 6/1992 | Zortea | ..................... | H04N 17/02 348/186 |
| 6,256,062 B1 * | 7/2001 | Endo | .................... | H04N 17/002 348/188 |
| 6,987,533 B2 | 1/2006 | Corley | | |
| 7,221,373 B2 * | 5/2007 | Dornan | ................... | G01J 3/522 345/591 |
| 7,570,282 B1 * | 8/2009 | Kaplinsky | .............. | H04N 17/02 382/167 |
| 2002/0163676 A1 * | 11/2002 | Jones | ................... | H04N 1/6011 348/E9.009 |
| 2010/0253946 A1 | 10/2010 | Corley | | |
| 2011/0063454 A1 | 3/2011 | Corley | | |
| 2012/0206475 A1 * | 8/2012 | Bryant | ................. | H04N 1/6077 345/589 |
| 2013/0027720 A1 * | 1/2013 | Satoh | ....................... | H04N 1/60 358/1.9 |
| 2017/0061260 A1 | 3/2017 | Corley | | |
| 2022/0103721 A1 * | 3/2022 | Matsubara | ........... | H04N 1/6033 |

* cited by examiner

*Primary Examiner* — Ali Bayat

(57) ABSTRACT

In one example, a color reference chart for evaluating a chrominance signal of a video image includes a plurality of color samples arranged in an array, wherein the plurality of color samples comprises: a first color sample of a first known, non-neutral hue and saturation and a second color sample of a second known, non-neutral hue and saturation positioned so that at least a portion of the second color sample is directly adjacent to at least a portion of the first color sample, and a barrier of a known neutral color positioned directly adjacent to the plurality of color samples without separating the at least a portion of the second color sample from the at least a portion of the first color sample.

20 Claims, 7 Drawing Sheets

200

| | Low<br>M | Low<br>B | Low<br>C | Low<br>G | Low<br>Y | |
|---|---|---|---|---|---|---|
| Low<br>R | Black | | | White | | High<br>R |
| | Y<br>High | G<br>High | C<br>High | B<br>High | M<br>High | |

700

COLOR REFERENCE PATTERN FOR CHROMINANCE EVALUATION IN IMAGES

FIELD OF THE DISCLOSURE

The present disclosure generally relates to the measurement of color, and more specifically relates to a reference pattern for use in evaluating the chrominance of images.

BACKGROUND

Chrominance is the signal used in video systems to convey the color information of the picture, separately from the accompanying luminance signal which conveys the brightness of the picture. Conventional color reference charts that rely on video vectorscopes use discreet color samples that are surrounded by solid-colored (e.g., black, white, or neural grey) borders, such that a border separates the color samples in each pair of adjacent color samples. By separating the color samples in this way, a point and single line that represents the hue angle of each color value can be created.

SUMMARY OF THE DISCLOSURE

In one example, a color reference chart for evaluating a chrominance signal of a video image includes a plurality of color samples arranged in an array, wherein the plurality of color samples comprises: a first color sample of a first known, non-neutral hue and saturation and a second color sample of a second known, non-neutral hue and saturation positioned so that at least a portion of the second color sample is directly adjacent to at least a portion of the first color sample, and a barrier of a known neutral color positioned directly adjacent to the plurality of color samples without separating the at least a portion of the second color sample from the at least a portion of the first color sample.

In another example, a color reference chart for evaluating a chrominance signal of a video image includes a first edge color sample extending along an entirety of a first edge of an array, wherein the first edge color sample comprises a red color sample of a first known saturation level, a second edge color sample extending along an entirety of a second edge of the array opposite the first edge, wherein the second edge color sample comprises a red color sample of a second known saturation level that is higher than the first known saturation level, a first row positioned between the first edge color sample and the second edge color sample and containing a first plurality of color samples of the first known saturation level, wherein the first plurality of color samples comprises: a first magenta color sample positioned directly adjacent to the first edge color sample, a first blue color sample positioned directly adjacent to the first magenta color sample, a first cyan color sample positioned directly adjacent to the first blue color sample, a first green color sample positioned directly adjacent to the first cyan color sample, and a first yellow color sample positioned directly adjacent to the first green color sample and the second edge color sample, a second row positioned between the first edge color sample and the second edge color sample and containing a second plurality of color samples of the second known saturation level, wherein the second plurality of color samples comprises: a second yellow color sample positioned directly adjacent to the first edge color sample, a second green color sample positioned directly adjacent to the second yellow color sample, a second cyan color sample positioned directly adjacent to the second green color sample, a second blue color sample positioned directly adjacent to the second cyan color sample, and a second magenta color sample positioned directly adjacent to the second blue color sample and the second edge color sample, and a barrier positioned between the first row and the second row, wherein the barrier contains a first partition of a first neutral color positioned directly adjacent to a second partition of a second neutral color.

In another example, a method performed by a processing system including at least one processor includes capturing a frame of a digital image, where the frame contains a color reference chart that contains a first non-neutral color sample and a second non-neutral color sample positioned adjacent to each other, without a barrier of a neutral color separating the first color sample and the second color sample, comparing, by the processing system, an appearance of a pattern created by the color reference chart in the frame using a video vectorscope to an expected appearance of the pattern, determining, by the processing system in response to the appearance of the pattern, that a color value of the video signal should be adjusted, and adjusting, by the processing system, the color value of the video signal until the appearance of the pattern when viewed using the video vectorscope matches the expected appearance of the pattern.

BRIEF DESCRIPTION OF THE DRAWINGS

The teachings of the present disclosure can be readily understood by considering the following detailed description in conjunction with the accompanying drawings, in which.

DETAILED DESCRIPTION

In one example, the present disclosure includes a reference pattern for use in evaluating the chrominance of images. As discussed above, chrominance is the signal used in video systems to convey the color information of the video image, separately from the accompanying luminance signal which conveys the brightness of the video image. Conventional color reference charts that rely on video vectorscopes use discreet color samples that are surrounded by solid-colored (e.g., black, white, or neural grey) borders, such that a border separates the color samples in each pair of adjacent color samples. By separating the color samples in this way, a point and single line that represents the hue angle of each color value can be created.

However, each color sample in the color reference chart represents only a single hue, and the color reference chart provides no visual representation of the color values or hues that exist between any two explicitly represented hues. Although primary and secondary hues can be assessed visually when processed and viewed using a video vectorscope, no information is provided for the remainder of the color captured within the video image. Thus, any color correction or adjustment that is made to the video image may influence the hues that are located in the space between any two hue angles, without a viewer recognizing such influence.

Examples of the present disclosure provide a color reference pattern for use in evaluating the chrominance of images where the pattern comprises a plurality of saturated color samples that is arranged in an array, without borders between adjacent color samples. In other words, a first color sample and a second color sample (representing, respectively, a first hue and a second hue) may be positioned adjacent to each other in the color reference pattern, without a neutral border separating the first color sample and the second color sample. Each color sample has a known hue and saturation (e.g., purity).

When a digital image of the disclosed color reference pattern is processed or encoded using chroma subsampling, color information may be interpolated to generate color values or hues that exist between each primary and secondary hue but which are not explicitly represented in the color reference pattern. When the disclosed color reference pattern is viewed using a video vectorscope or waveform monitor, a pattern may be generated and displayed that can be used to evaluate the quality, accuracy, and balance of the captured chrominance signal. The displayed pattern may be used as a reference for both instant evaluation of the color being processed by the image capturing device or imaging platform and later adjustment, correction, and manipulation of the video signal. These and other aspects of the disclosure are discussed in greater detail below with reference to FIGS. 1-7.

Figure 1:
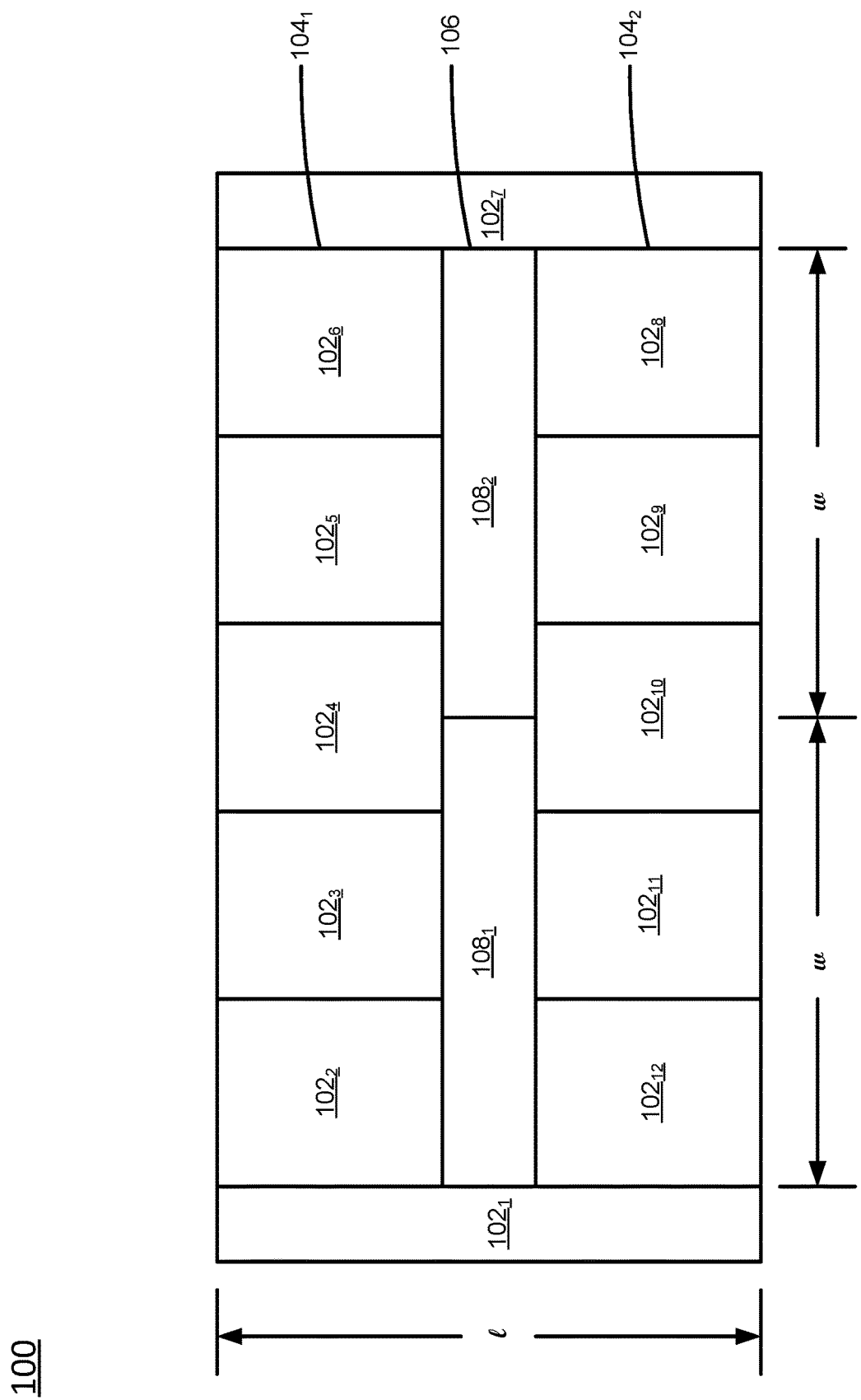
FIG. 1 illustrates an example color reference chart of the present disclosure.

To further aid in understanding the present disclosure, FIG. 1 illustrates an example color reference chart 100 of the present disclosure. As illustrated, the color reference chart 100 comprises a plurality of color samples $102_1$-$102_{12}$ (hereinafter individually referred to as a "color sample 102" or collectively referred to as "color samples 102"). Although the example color reference chart 100 is illustrated as including twelve color samples 102, it will be appreciated that a color reference chart may include more than or fewer than twelve color samples (but no fewer than two color samples) without departing from the scope of the present disclosure.

In one example, the color reference chart is rectangular in shape, and the color samples 102 are arranged in an array within the rectangular shape. The array may include two edge color samples positioned along opposite outside edges of the color reference chart 100 (e.g., color samples $102_1$ and $102_7$ in the example illustrated in FIG. 1). The two edge color samples may be substantially rectangular in shape and may be of the same size and dimensions. A longest dimension I of the edge color samples may extend along an entire edge of the color reference chart 100.

The rest of the color samples 102 (e.g., color samples $102_2$-$102_6$ and $102_8$-$102_{12}$) may be positioned between the two edge color samples (e.g., between the opposite outside edges of the color reference chart 100). In one example, the rest of the color samples 102 are arranged in two rows, i.e., a first row $104_1$ and a second row $104_2$. In one example, each of the first row $104_1$ and the second row $104_2$ contains five color samples (e.g., color samples $102_2$-$102_6$ in the first row $104_1$, and color samples $102_8$-$102_{12}$ in the second row $104_2$). However, in other examples, the color reference chart 100 may contain more or fewer than two rows, and each row may contain more or fewer than five color samples 102.

In one example, the color samples 102 in the first row $104_1$ and the second row $104_2$ may be substantially rectangular in shape and may be of the same size and dimensions. In one example, the color samples 102 in the first row $104_1$ and the second row $104_2$ may be of a different size and different dimensions than the edge color samples (i.e., color samples $102_1$ and $102_7$ in FIG. 1).

In one example, each of the color samples 102 comprises a sample of a different hue and/or saturation level. For instance, the color samples in the first row $104_1$ of the array (e.g., color samples $102_2$-$102_6$ of FIG. 1) and in one of the edge color samples (e.g., color sample $102_1$) may comprise color samples of a relatively lower saturation level. As an example, color samples $102_2$-$102_6$ and $102_1$ may have a saturation level of approximately 37.5%. The color samples in the second row $104_2$ of the array (e.g., color samples $102_8$-$102_{12}$ of FIG. 1) and in the other edge color sample (e.g., color sample $102_7$) may comprise color samples of a relatively higher saturation level (e.g., higher saturation than the "lower saturation" color samples). As an example, color samples $102_8$-$102_{12}$ and $102_7$ may have a saturation level of approximately 50%. The intention is for the color samples 102 to align with the targets that are shown on a video vectorscope. Normally, the targets on a video vectorscope represent 75% (e.g., low) and 100% (e.g., high) color saturation levels, but for printed color reference charts, the video vectorscope is viewed with a 2× zoom.

In one example, a barrier 106 is positioned between the first row $104_1$ and the second row $104_2$. A longest dimension of the barrier 106 may be equal to a longest dimension of the first and second rows $104_1$ and $104_2$; however, a shortest dimension of the barrier 106 may be narrower than a shortest dimension of the first and second rows $104_1$ and $104_2$.

In one example, the barrier 106 is divided into two partitions, e.g., a first partition $108_1$ and a second partition $108_2$. Each of the first partition $108_1$ and the second partition $108_2$ may contain a neutral (e.g., not saturated) color, such as black, white, or a neutral grey. In one example, the first partition $108_1$ and the second partition $108_2$ contain different neutral colors. For instance, the first partition $108_1$ may contain black, while the second partition $108_2$ may comprise white. In one example, a longest dimension w of each of the partitions $108_1$ and $108_2$ may extend half the distance across the space between the edge color samples. The partitions $108_1$ and $108_2$ may be substantially rectangular in shape and may be of the same size and dimensions. In one example, the partitions $108_1$ and $108_2$ may be of a different size and different dimensions than the edge color samples 102 and the color samples 102 contained in the first and second rows $104_1$ and $104_2$.

As can be seen from FIG. 1, every color sample 102 is positioned directly adjacent to at least one other color sample 102 in such a way that there is no neutral colored border between the two color samples (even though every color sample 102 is also positioned directly adjacent to the barrier 106). For instance, edge color sample $102_1$ is positioned directly adjacent to color samples $102_2$ and $102_{12}$. Although edge color sample $102_1$ is also positioned directly adjacent to the first partition $108_1$, the first partition $108_1$ is not positioned between (i.e., does not form a border or separation between) the edge color sample $102_1$ and the color samples $102_2$ and $102_{12}$. Similarly, color sample $102_3$ is positioned directly adjacent to color samples $102_2$ and $102_4$. Although color sample $102_3$ is also positioned directly adjacent to the first partition $108_1$, the first partition $108_1$ is not positioned between (i.e., does not form a border or separation between) the color sample $102_3$ and the color samples $102_2$ and $102_4$.

Figures 2A, 2B:
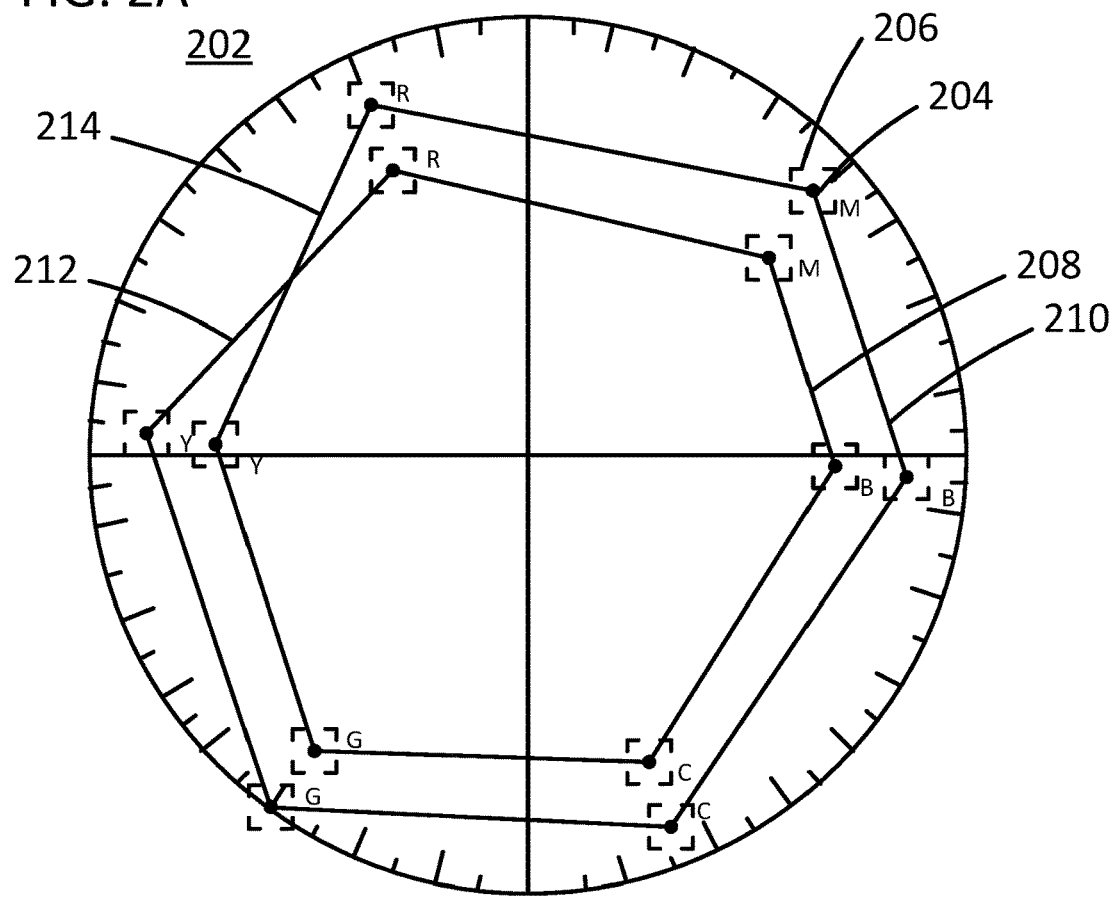
FIG. 2A illustrates a specific example of the color reference chart of FIG. 1.
FIG. 2B illustrates one example of the color reference chart of FIG. 2A being viewed through a video vectorscope.

FIG. 2A illustrates a specific example of the color reference chart 100 of FIG. 1. In FIG. 2A, the color reference chart 200 contains color samples for two different (e.g., high and low saturation) levels for a plurality of hues, namely, red (R), green (G), blue (B), cyan (C), magenta (M), and yellow (Y).

In the example illustrated in FIG. 2A, the edge color samples are red (R) color samples; one of the edge color samples is a low saturation red sample, and the other edge color sample is a high saturation red sample. The first row contains low saturation color samples for magenta (M), blue (B), cyan (C), green (G), and yellow (Y) in that order, with magenta being positioned directly adjacent to the low saturation red (R) color sample and yellow being positioned directly adjacent to the high saturation red (R) color sample. The second row contains high saturation color samples for yellow (Y), green (G), cyan (C), blue (B), and magenta (M) in that order, with yellow being positioned directly adjacent to the low saturation red color sample and magenta being positioned directly adjacent to the high saturation red color sample. The barrier contains neutral partitions of black and white, with the black partition being positioned directly adjacent to the low saturation red (R) color sample and the white partition being positioned directly adjacent to the high saturation red (R) color sample.

Thus, the edge color samples together with the first and second rows effectively form a circular array in which the color samples are positioned directly adjacent to each other (without neutral borders in between). The arrangement of the color samples follows a repeating order of red (R), magenta (M), blue (B), cyan (C), green (G), yellow (Y), with the low saturation samples occurring before the high saturation samples. The barrier provides a neutral color separation between the first and second (low saturation and high saturation) rows.

FIG. 2B illustrates an example result of the color reference chart 200 of FIG. 2A being viewed through a video vectorscope 202. In a calibrated video signal, each color sample in the color reference chart 200 would create a point in the center of each target box on the vectorscope 202, signifying accurate color hue and saturation level. For illustrative purposes, FIG. 2B shows the point and the target box corresponding to the high saturation magenta color sample being labeled by the reference numerals 204 and 206, respectively. Points and target boxes for the remaining color samples (i.e., low saturation magenta, high and low saturation red, high and low saturation blue, high and low saturation cyan, high and low saturation green, and high and low saturation yellow) are also illustrated in FIG. 2B, but are not labeled with reference numerals for the sake of simplicity. Each line on the vectorscope 202 is the result of an interpolation of chrominance data that is processed during chroma subsampling.

Referring simultaneously to FIGS. 1 and 2A-2B, the low saturation color samples (i.e., color samples $102_1$-$102_6$) form the inner polygon 208 of FIG. 2B, while the high saturation color samples (i.e., color samples $102_7$-$102_{12}$) form the outer polygon 210 of FIG. 2B. The low saturation yellow color sample (i.e., color sample $102_6$) is connected to the high saturation red color sample (i.e., color sample $102_7$) by a line 214 that crosses from the inner polygon 208 to the outer polygon 210. Similarly, the high saturation yellow color sample (i.e., color sample $102_{12}$ is connected to the low saturation red color sample (i.e., color sample $102_1$) by a line 212 that crosses from the outer polygon 210 back to the inner polygon 208 to create the pattern illustrated in FIG. 2B.

The two distinct lines creating the inner and outer polygons 208 and 210 are possible due to the neutral color barrier that the barrier 106 of the color reference chart 100 provides between the first row $104_1$ and the second row $104_2$ of the color samples (e.g., between the low saturation and high saturation color samples). Since only red and yellow color samples connect at different saturation levels, the only area of crossover on the video vectorscope 202 occurs between the red and yellow hues. By contrast, if the first row $104_1$ and the second row $104_2$ of the color reference chart were positioned directly adjacent to each other (i.e., without the separation of the barrier 106), additional (unintended) connecting lines between color samples of different saturation levels would be present on the video vectorscope 202.

The design of the color reference chart 100 (as well as the more specific example of the color reference chart 200) provides advantages that cannot be attained using conventional color reference charts when used as a quick reference tool while recording video and when used later during editing and post-production of recorded video. For instance, when preparing a video camera to record, a video vectorscope and a waveform monitor may be used to check the quality of the video image with respect to exposure and color accuracy. The video vector scope and the waveform monitor may provide more accurate exposure and color accuracy information than a video monitor.

Figure 3A:
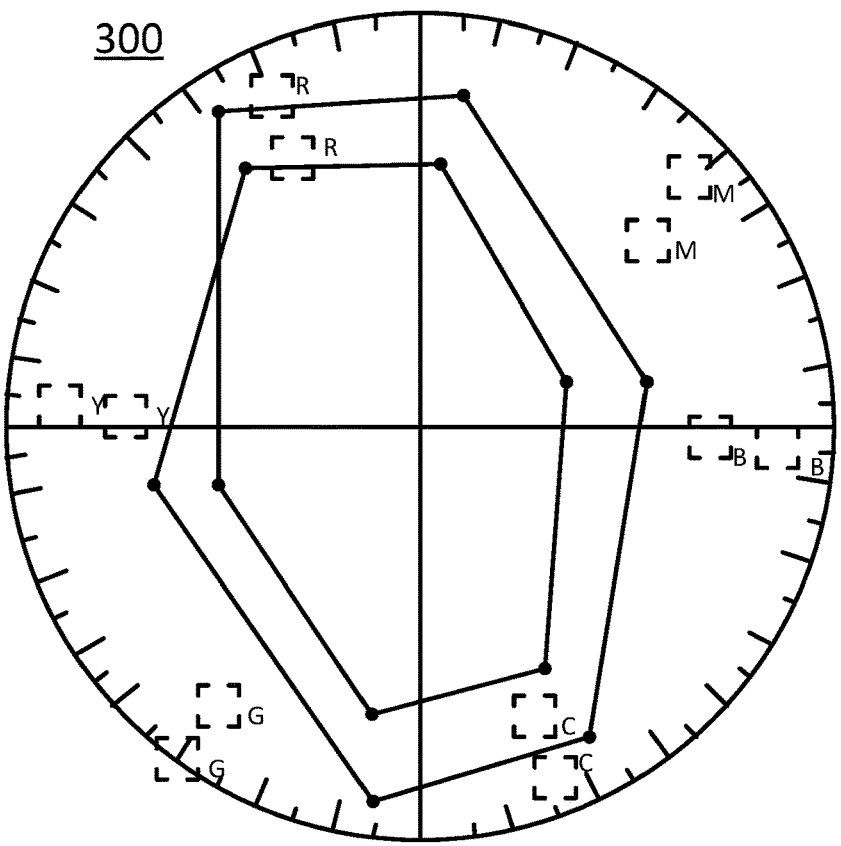
FIG. 3A illustrates one example of the color reference chart of FIG. 2A being viewed through a video vectorscope in which the color accuracy of the recorded video signal is poor.

By placing the color reference chart 100 or the color reference chart 200 in the video image (e.g., in a frame of the video signal) and viewing the color reference chart 100 or the color reference chart 200 using a video vectorscope, the pattern of connecting inner and outer polygons illustrated in FIG. 2B may be seen. A user may quickly judge the accuracy of the recorded video signal's color signal by checking the shape of the connecting inner and outer polygons. FIG. 3A, for instance, illustrates one example of the color reference chart 200 of FIG. 2A being viewed through a video vectorscope 300 in which the color accuracy of the recorded video signal is poor. As shown in FIG. 3A, none of the points representing the color samples are in the target boxes that signify accurate color hue and saturation level, creating polygons that are skewed into an incorrect shape and rotated away from their intended target boxes.

Figure 3B:
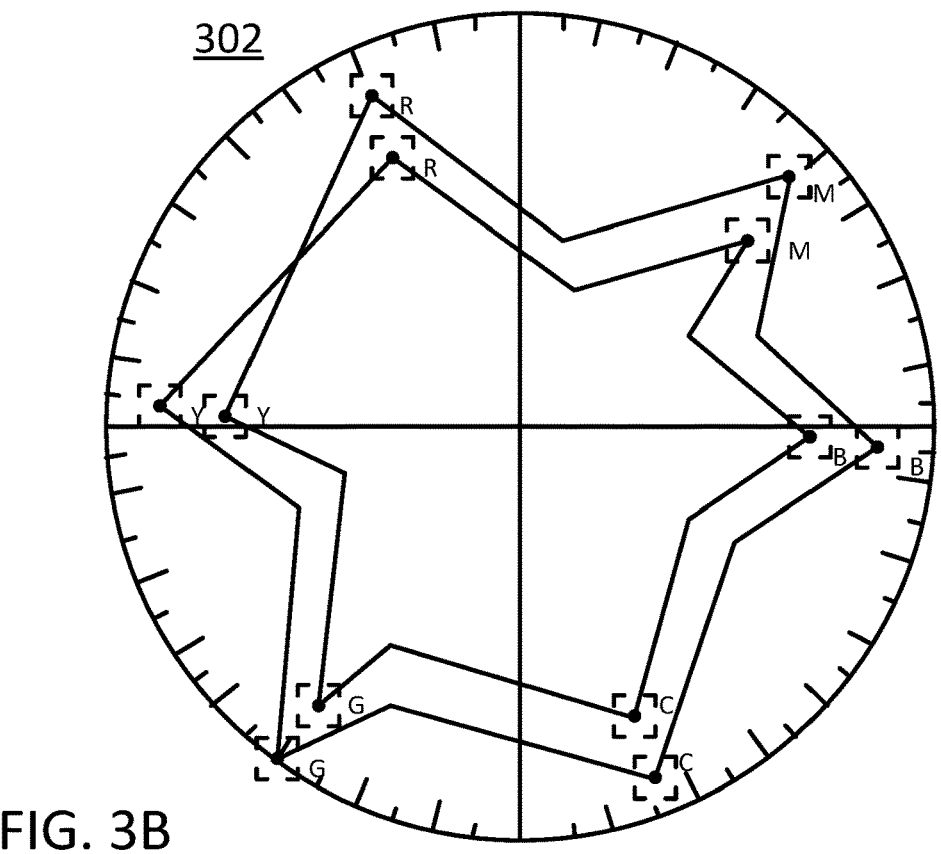
FIG. 3B illustrates one example of the color reference chart of FIG. 2A being viewed through a video vectorscope in which a corresponding video image has been color corrected so that the points representing the color samples are aligned with the corresponding target boxes on the video vectorscope.

In a post-production environment (i.e., where the video signal is already recorded), a frame of a recorded video signal may be viewed in which the color reference chart 100 or the color reference chart 200 has been placed. The presence of the color reference chart 100 or the color reference chart 200 may provide guidance for compressing or stretching colors that fall between the primary and secondary hues when making adjustments to or correcting color in the recorded video signal. For example, the shape and state of the pattern that is viewable through a video vectorscope can be monitored to determine the effects that any color corrections have on the color space as a whole. FIG. 3B, for instance, illustrates one example of the color reference chart 200 of FIG. 2A being viewed through a video vectorscope 302 in which a corresponding video image has been color corrected so that the points representing the color samples are aligned with the corresponding target boxes on the video vectorscope 302. In the example of FIG. 3B, even though the specific hues used by the color samples are displaying correctly, the hues occurring in between the points are not displaying correctly, as is evident by the segmented lines connecting many of the points.

The example color reference patterns 100 and 200 illustrated in FIGS. 1 and 2A represent one example of a color reference pattern according to the present disclosure. A color reference pattern according to the present disclosure may also be arranged in other ways, as long as the color reference pattern contains a plurality of saturated color samples that is arranged in an array, without neutral borders or barriers positioned between adjacent color samples. In other words, a color reference pattern according to the present disclosure could be arranged in a manner different to that shown in FIGS. 1 and 2A, but still contain a first color sample and a second color sample that are positioned adjacent to each other in the color reference pattern, without a border of a neutral color separating the first color sample and the second color sample.

Figure 4A:
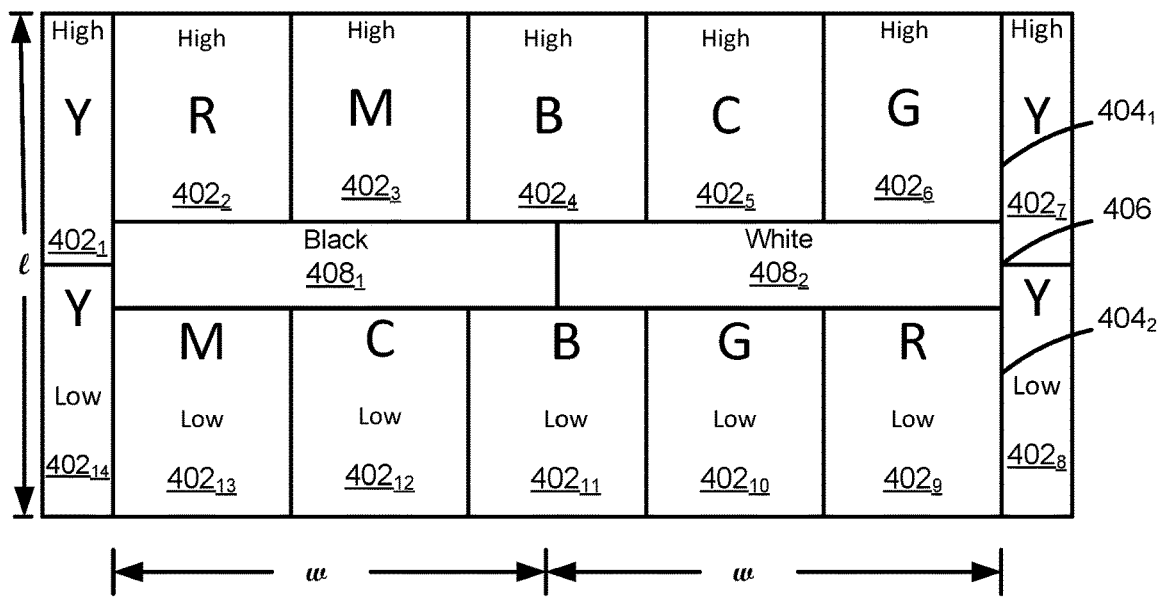
FIG. 4A illustrates another example color reference chart of the present disclosure.

FIG. 4A, for instance, illustrates another example color reference chart 400 of the present disclosure. As illustrated, the color reference chart 400 comprises a plurality of color samples $402_1$-$102_{14}$ (hereinafter individually referred to as a "color sample 402" or collectively referred to as "color samples 402"). Although the example color reference chart 400 is illustrated as including fourteen color samples 402, it will be appreciated that a color reference chart may include more than or fewer than fourteen color samples (but no fewer than two color samples) without departing from the scope of the present disclosure.

In one example, the color reference chart is rectangular in shape, and the color samples 402 are arranged in an array within the rectangular shape. The array may include four edge color samples positioned along opposite outside edges of the color reference chart 400 (e.g., color samples $402_1$, $402_7$, $402_8$, and $402_{14}$ in the example illustrated in FIG. 4A). In one example, two edge color samples are positioned, adjacent to each other, along each outside edge of the color reference chart 400. For instance, edge color samples $402_1$ and $402_{14}$ may be positioned adjacent to each other along one outside edge, while edge color samples $402_7$ and $402_8$ are positioned adjacent to each other along the opposite outside edge. The four edge color samples may be substantially rectangular in shape and may be of the same size and dimensions. A longest dimension of the edge color samples may extend along half of an edge of the color reference chart 400, such that when two edge color samples are positioned adjacent to each other, the two edge color samples span the entire edge.

The rest of the color samples 402 (e.g., color samples $402_2$-$402_6$ and $402_9$-$402_{13}$) may be positioned between the two edge color samples (e.g., between the opposite outside edges of the color reference chart 400). In one example, the rest of the color samples 402 are arranged in two rows, i.e., a first row $404_1$ and a second row $404_2$. In one example, each of the first row $404_1$ and the second row $404_2$ contains five color samples (e.g., color samples $402_2$-$402_6$ in the first row $404_1$, and color samples $402_9$-$402_{13}$ in the second row $404_2$). However, in other examples, the color reference chart 400 may contain more or fewer than two rows, and each row may contain more or fewer than five color samples 402.

In one example, the color samples 402 in the first row $404_1$ and the second row $404_2$ may be substantially rectangular in shape and may be of the same size and dimensions. In one example, the color samples 402 in the first row $404_1$ and the second row $404_2$ may be of a different size and different dimensions than the edge color samples (i.e., color samples $402_1$ and $402_7$ in FIG. 4A).

In one example, each of the color samples 402 comprises a sample of a different hue and/or saturation level. For instance, the color samples in the first row $404_1$ of the array (e.g., color samples $402_2$-$402_6$ of FIG. 4A) and one of the edge color samples along each edge of the color reference chart 400 (e.g., color samples $402_1$ and $402_7$) may comprise color samples of a relatively higher saturation level (e.g., 50% saturation, as discussed above). The color samples in the second row $404_2$ of the array (e.g., color samples $402_9$-$402_{13}$ of FIG. 4A) and the other edge color samples (e.g., color samples $402_8$ and $402_{14}$) may comprise color samples of a relatively lower saturation level (e.g., lower saturation than the "higher saturation" color samples, such as 37.5% saturation as discussed above).

In one example, a barrier 406 is positioned between the first row $404_1$ and the second row $404_2$. A longest dimension of the barrier 406 may be equal to a longest dimension of the first and second rows $404_1$ and $404_2$; however, a shortest dimension of the barrier 406 may be narrower than a shortest dimension of the first and second rows $404_1$ and $404_2$.

In one example, the barrier 406 is divided into two partitions, e.g., a first partition $408_1$ and a second partition $408_2$. Each of the first partition $408_1$ and the second partition $408_2$ may contain a neutral (e.g., not saturated) color, such as black, white, or a neutral grey. In one example, the first partition $408_1$ and the second partition $408_2$ contain different neutral colors. For instance, the first partition $408_1$ may contain black, while the second partition $408_2$ may comprise white. In one example, a longest dimension w of each of the partitions $408_1$ and $108_2$ may extend half the distance across the space between the edge color samples. The partitions $408_1$ and $408_2$ may be substantially rectangular in shape and may be of the same size and dimensions. In one example, the partitions $408_1$ and $408_2$ may be of a different size and different dimensions than the edge color samples 402 and the color samples 402 contained in the first and second rows $404_1$ and $404_2$.

As can be seen from FIG. 4A, every color sample 402 is positioned directly adjacent to at least one other color sample 402 in such a way that there is no neutral colored border between the two color samples (even though every color sample 402 is also positioned directly adjacent to the barrier 406). For instance, edge color sample $402_1$ is positioned directly adjacent to color samples $402_2$ and $402_{14}$. Although edge color sample $402_1$ is also positioned directly adjacent to the first partition $408_1$, the first partition $408_1$ is not positioned between (i.e., does not form a border or separation between) the edge color sample $402_1$ and the color samples $402_2$ and $102_{14}$. Similarly, color sample $402_3$ is positioned directly adjacent to color samples $402_2$ and $402_4$. Although color sample $402_3$ is also positioned directly adjacent to the first partition $408_1$, the first partition $408_1$ is not positioned between (i.e., does not form a border or separation between) the color sample $402_3$ and the color samples $402_2$ and $402_4$.

Figure 4B:
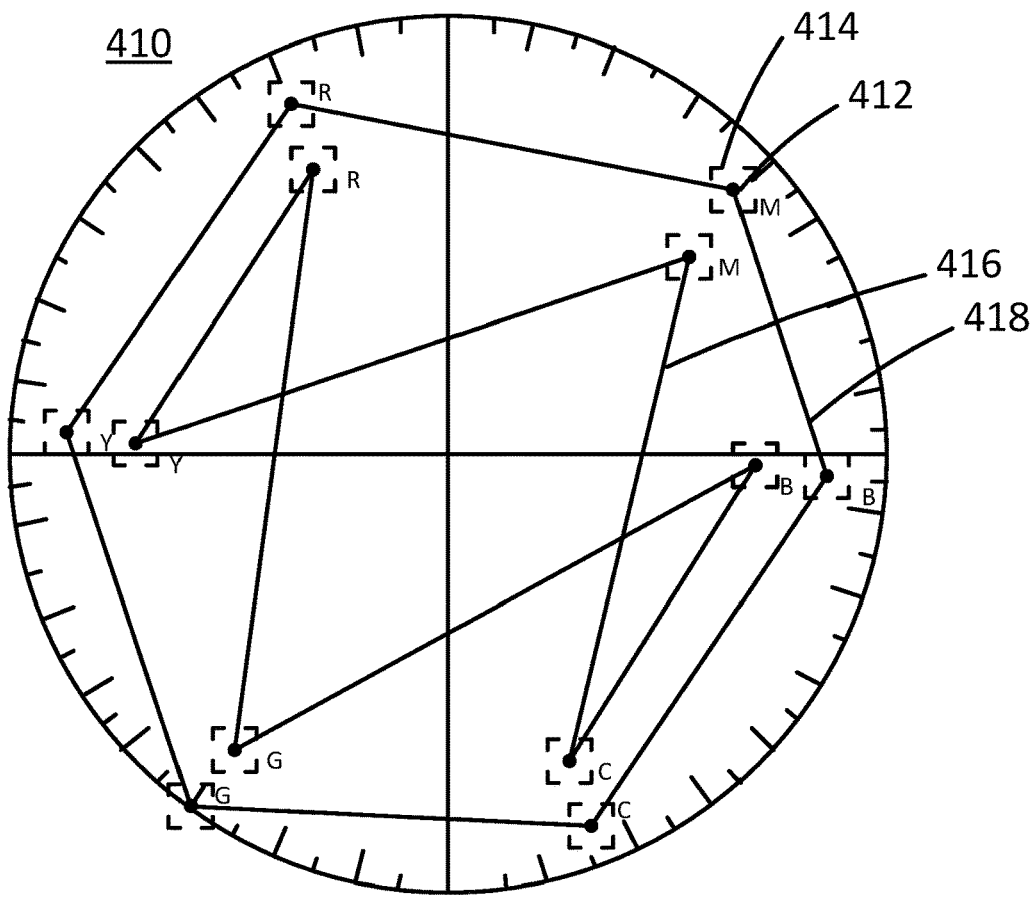
FIG. 4B illustrates an example result of the color reference chart of FIG. 4A being viewed through a video vectorscope.

FIG. 4B illustrates an example result of the color reference chart 400 of FIG. 4A being viewed through a video vectorscope 410. In a calibrated video signal, each color sample in the color reference chart 400 would create a point in the center of each target box on the vectorscope 410, signifying accurate color hue and saturation level. For illustrative purposes, FIG. 4B shows the point and the target box corresponding to the high saturation magenta color sample being labeled by the reference numerals 412 and 414, respectively. Points and target boxes for the remaining color samples (i.e., low saturation magenta, high and low saturation red, high and low saturation blue, high and low saturation cyan, high and low saturation green, and high and low saturation yellow) are also illustrated in FIG. 4B, but are not labeled with reference numerals for the sake of simplicity. Each line on the vectorscope 410 is the result of an interpolation of chrominance data that is processed during chroma subsampling.

Referring simultaneously to FIGS. 4A and 4B, the low saturation color samples (i.e., color samples $402_8$-$402_{14}$) form the inner triangular or zigzag pattern 416 of FIG. 4B, while the high saturation color samples (i.e., color samples $402_1$-$402_7$) form the outer polygon 418 of FIG. 4B. In the example illustrated in FIGS. 4A and 4B, the inner triangular pattern 416 provides more information in the midtones in the skin tone area (e.g., between red and yellow).

Figure 5A:
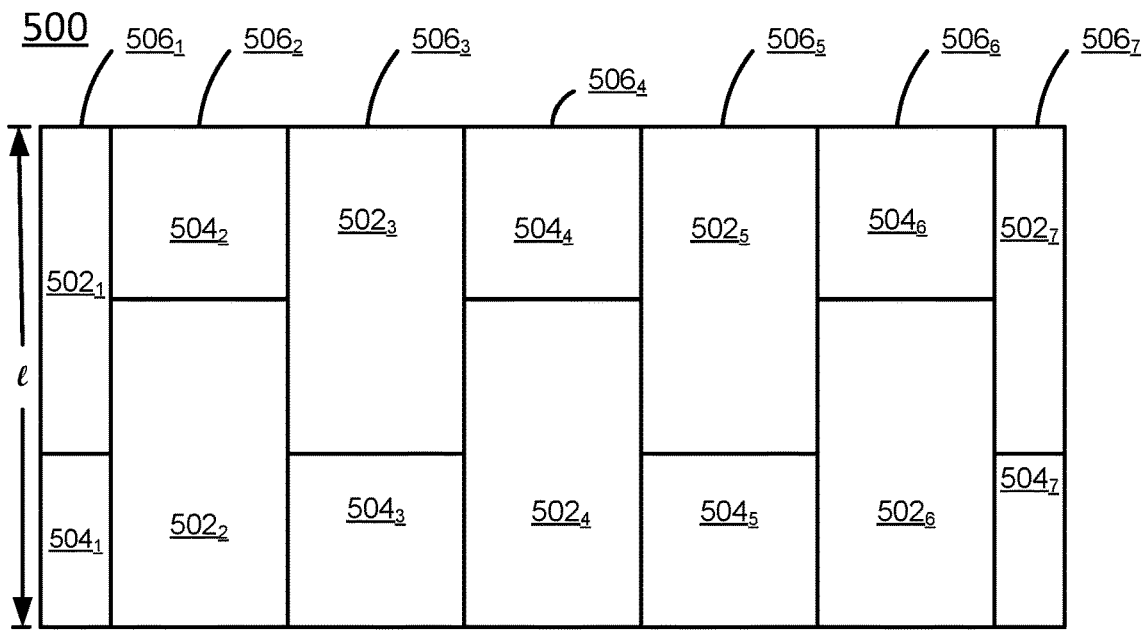
FIG. 5A illustrates another example color reference chart of the present disclosure.

FIG. 5A illustrates another example color reference chart 500 of the present disclosure. As illustrated, the color reference chart 500 comprises a plurality of color samples $502_1$-$502_7$ (hereinafter individually referred to as a "color sample 502" or collectively referred to as "color samples 502") and a plurality of barriers $504_1$-$504_7$ (hereinafter individually referred to as a "barrier 504" or collectively referred to as "barriers 504"). Although the example color reference chart 500 is illustrated as including seven color samples 502 and seven barriers 504, it will be appreciated that a color reference chart may include more than or fewer than seven color samples and/or barriers (but no fewer than two color samples) without departing from the scope of the present disclosure. Moreover, a color reference chart according to the present disclosure may include different numbers of color samples and barriers, such that there is not necessarily a one-to-one correspondence between color samples and barriers.

In one example, the plurality of color samples 502 contains a plurality of non-neutral hues (e.g., red, green, blue, cyan, magenta, and/or yellow) of a single, same saturation level (e.g., high or low). The plurality of barriers 504 may contain a plurality of neutral colors (e.g., black, white, and/or neutral grey). All of the barriers 504 may contain the same neutral color (e.g., all black, all white, or all neutral grey), or the barriers 504 may contain a plurality of different neutral colors (e.g., a mix of black, white, and/or neutral grey).

In one example, the color reference chart is rectangular in shape, and the color samples 502 and barriers 504 are arranged in an array within the rectangular shape. The array may include a plurality of columns $506_1$-$506_7$ (hereinafter individually referred to as a "column 506" or collectively referred to as "columns 506") that each spans the entire length l of an edge of the color reference chart 500. Although the example color reference chart 500 is illustrated as including seven columns 506, it will be appreciated that a color reference chart may include more than or fewer than seven columns without departing from the scope of the present disclosure.

In one example, each column 506 may contain one color sample 502 and one barrier 504. The color samples 502 and barriers 504 may be substantially rectangular in shape. However, the color samples 502 may have a larger area than the barriers 504. For instance, within each column 506, the corresponding color sample 502 and barrier 504 may have the same width, but the color sample 502 may be longer than the barrier 504.

In one example, the columns 506 on opposite edges of the color reference chart 500 (e.g., first and last columns $506_1$ and $506_7$ in FIG. 5A) may be narrower (or have smaller areas) than the remaining columns 506. Moreover, the color samples 502 that are contained within these edge columns (e.g., color samples $502_1$ and $502_7$ in FIG. 5A) may be of the same non-neutral color. The barriers that are contained within these edge columns (e.g., barriers $504_1$ and $504_7$ in FIG. 5A) may or may not be of the same neutral color.

The middle columns 506 of the color reference chart 500 (e.g., columns $506_2$-$506_6$ in FIG. 5A) may be wider than the edge columns 506. The plurality of columns 506 may be arranged so that at least part of the color samples 502 of adjacent columns are positioned directly adjacent to each other (i.e., without being separated by a third color sample or barrier of a neutral color) or at least partially overlap; however, the barriers 504 in adjacent columns will not be positioned directly adjacent to each other and will not overlap.

Figure 5B:
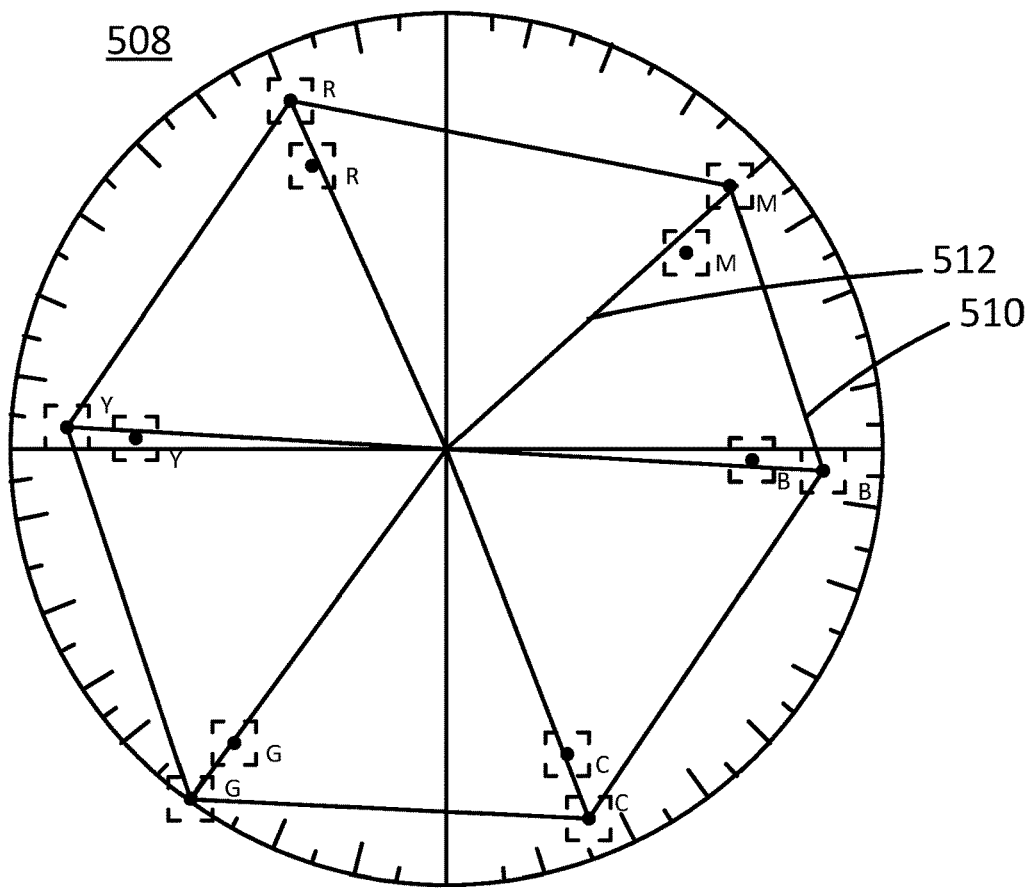
FIG. 5B illustrates an example result of the color reference chart of FIG. 5A being viewed through a video vectorscope.

FIG. 5B illustrates an example result of the color reference chart 500 of FIG. 5A being viewed through a video vectorscope 508. Referring simultaneously to FIGS. 5A and 5B, the layout of the color reference chart 500 creates an outer polygon pattern 510 and an inner starburst pattern 512 that connects the vertices of the polygon pattern 510 to a center of the polygon pattern. This combination of outer polygon pattern 510 and inner starburst pattern 512 can be created using color samples of no more than six different non-neutral colors at a single, same saturation level (e.g., high or low) and a plurality of neutral color samples.

Figure 6:
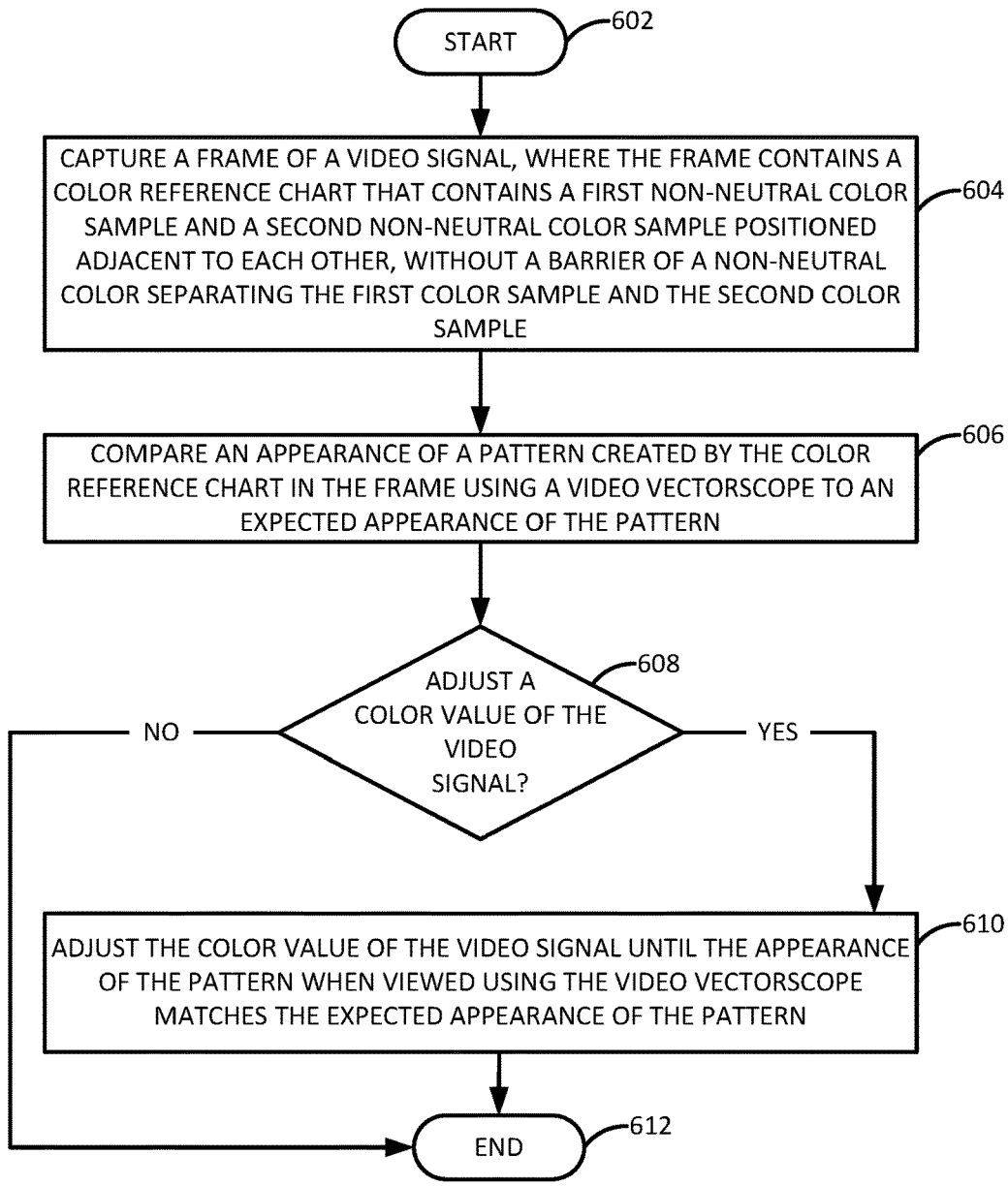
FIG. 6 is a flow chart illustrating one example of a method for using a color reference chart to evaluate the chrominance signal of a video image, according to the present disclosure.

FIG. 6 is a flow chart illustrating one example of a method 600 for using a color reference chart to evaluate the chrominance signal of a video image, according to the present disclosure. The method 600 may be performed, for example, by a computing system that includes a processor (such as the computing system 700 illustrated in FIG. 7). The computing system may be configured for viewing and editing video signals and may operate in conjunction with a video vectorscope. For the sake of example, the method 600 is described as being performed by a processing system.

The method 600 begins in step 602. In step 604, the processing system may capture a frame of a video signal, where the frame contains a color reference chart that contains a first non-neutral color sample and a second non-neutral color sample positioned adjacent to each other, without a barrier of a neutral color separating the first color sample and the second color sample.

In one example, the first non-neutral color sample and the second non-neutral color sample represent, respectively, a known first hue and a known second hue. For instance, each of the first non-neutral color sample and the second non-neutral color sample may contain a sample of one of red, green, blue, cyan, magenta, or yellow. The first non-neutral color sample and the second non-neutral color sample may be of a same, known saturation level, or may be of different saturation levels. For instance, in one example, the color reference chart may be configured in a manner similar to the color reference chart 100, the color reference chart 200, the color reference chart 400, or the color reference chart 500, described above. However, the color reference chart may also be configured in a different manner, as long as at least a portion of the first non-neutral color sample is positioned directly adjacent to at least a portion of the second non-neutral color sample (i.e., without being separated by a barrier of a neutral color).

In step 606, the processing system may compare an appearance of a pattern created by the color reference chart in the frame using a video vectorscope to an expected appearance of the pattern.

As discussed above, when the video signal is calibrated, each of the first non-neutral color sample and the second non-neutral color sample will create a point in the center of a target box on a video vectorscope. In addition, lines that are the result of interpolation of chrominance data that is processed during chroma subsampling may form a pattern that is also viewable using the video vectorscope. The appearance of this pattern may vary depending on the accuracy of the color of the video signal. For instance, when the color captured in the video signal is accurate, each end of each line may terminate at a point created by a color sample of the color reference chart, without any segmentation in the lines (i.e., each line may continue straight from one point to another point). This may represent an expected appearance of the pattern. However, the expected appearance of the pattern may vary depending upon the purpose for which the color reference chart was configured (e.g., whether the color reference chart is a specialized color reference chart configured for evaluating midtones in the skin tone area, for instance).

However, if the lines of the pattern do not intersect or terminate at the points created by the first non-neutral color sample and the second non-neutral color sample, or if the lines do intersect or terminate at these points but with segmentation occurring between points, this may indicate that the color that is being captured in the video signal is inaccurate.

In one example, step 606 may be performed while the video signal is being recorded or while a video camera is being prepared to record the video signal. In this case, a waveform monitor may also be used in conjunction with the video vectorscope to observe the appearance of the color reference chart with respect to exposure and color accuracy.

In another example, step 606 may be performed after the video signal has been recorded (e.g., during post-production or editing). After the video signal has been recorded, the color of the video signal may be adjusted or corrected. It is possible that, in the course of making such adjustments or corrections, colors that fall in between primary and secondary hues may be distorted (e.g., compressed or stretched). However, if the color reference chart is visible in a frame of the video signal, the pattern created by the lines resulting from interpolation of chrominance data can be observed using a video vectorscope. As discussed above, changes to the appearance of this pattern can be observed as adjustments are made in order to ensure color accuracy.

In step 608, the processing system may determine whether to adjust a color value of the video signal in response to the appearance of pattern.

In one example, the determination as to whether to adjust the color value may be made under the direction of a human operator. For instance, the human operator may observe the pattern created by the color reference chart using the video vectorscope, and may provide instructions to the processing system indicating that the color value should be adjusted. However, in other examples, the processing system may execute instructions that allow the processing system to automatically evaluate the appearance of the pattern with respect to an expected appearance and to automatically determine the need for and type of adjustments, if any, to be made to the color value.

If the processing system determines in step 608 that an adjustment to a color value of the video signal is not needed, then the method 600 may end in step 612.

If, however, the processing system determines in step 608 that an adjustment to a color value of the video signal is needed, then the method 600 may proceed to step 610. In step 610, the processing system may adjust the color value of the video signal until the appearance of the pattern when viewed using the video vectorscope matches the expected appearance of the pattern.

In one example, any adjustments that are made to the color signal in step 610 are made under the direction of a human operator. For instance, the human operator may observe the pattern created by the color reference chart using the video vectorscope, and may provide instructions to the processing system to adjust the color value. However, in other examples, the processing system may execute instructions that allow the processing system to automatically evaluate the pattern and automatically make adjustments to the color value based on the appearance of the pattern.

The method 600 may then end on step 612.

It should be noted that the method 600 may be expanded to include additional steps or may be modified to include additional operations with respect to the steps outlined above. In addition, although not specifically specified, one or more steps, functions, or operations of the method 600 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 6 that recite a determining operation or involve a decision do not necessarily require that both branches of the determining operation be practiced. In other words, one of the branches of the determining operation can be deemed as an optional step. Furthermore, steps, blocks, functions or operations of the above-described method can be combined, separated, and/or performed in a different order from that described above, without departing from the examples of the present disclosure.

Figure 7:
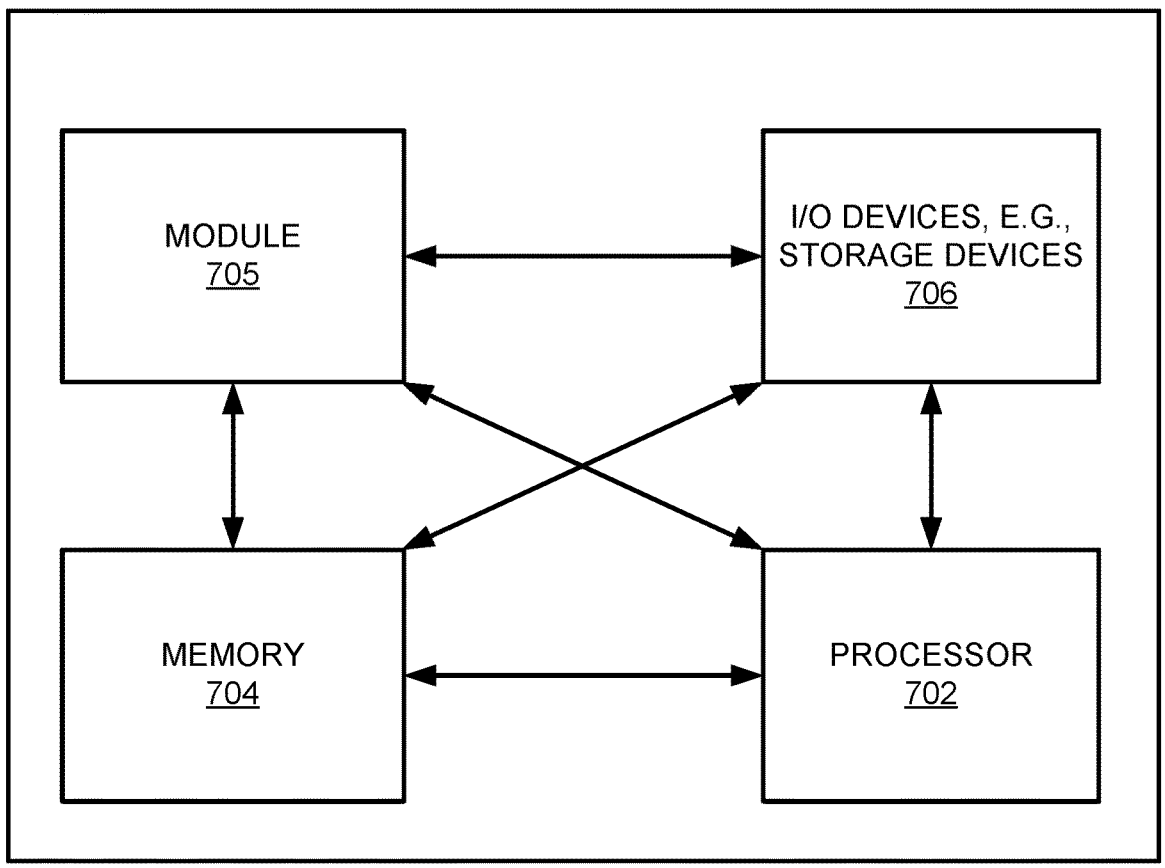
FIG. 7 is a high-level block diagram of a computing device that may be used to evaluate the chrominance signal of a video image, according to examples of the present disclosure.

FIG. 7 is a high-level block diagram of a computing device 700 that may be used to evaluate the chrominance signal of a video image, according to examples of the present disclosure. In one example, the computing device 700 may comprise a computing device that is communicatively coupled to a video vectorscope and/or waveform monitor.

As depicted in FIG. 7, the computing device 700 comprises a hardware processor element 702, e.g., a central processing unit (CPU), a microprocessor, or a multi-core processor, a memory 704, e.g., random access memory (RAM) and/or read only memory (ROM), a module 705 for evaluating the chrominance signal of a video image, and various input/output devices 706, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the computing device 700 may employ a plurality of processor elements. Furthermore, although one computing device 700 is shown in the figure, if the method(s) as discussed above is implemented in a distributed or parallel manner for a particular illustrative example, i.e., the blocks of the above method(s) or the entire method(s) are implemented across multiple or parallel electronic devices, then the computing device 700 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 705 for evaluating the chrominance signal of a video image, e.g., machine readable instructions can be loaded into memory 704 and executed by hardware processor element 702 to implement the blocks, functions or operations as discussed above in connection with the method 600. The memory 704 may store color reference charts, expected patterns for use in evaluating patterns created by the color reference charts that are viewed using a video vectorscope, and the like. Furthermore, when a hardware processor executes instructions to perform "operations", this could include the hardware processor performing the operations directly and/or facilitating, directing, or cooperating with another hardware device or component, e.g., a video vectorscope, a waveform monitor, video post-production equipment, a co-processor, or the like, to perform the operations.

The processor executing the machine readable instructions relating to the above-described method(s) can be perceived as a programmed processor or a specialized processor. As such, the present module 705 for evaluating the chrominance signal of a video image of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a color measurement apparatus.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A color reference chart for evaluating a chrominance signal of a video image, the color reference chart comprising:
    a plurality of color samples arranged in an array, wherein the plurality of color samples comprises:
        a first color sample of a first known, non-neutral hue and saturation; and
        a second color sample of a second known, non-neutral hue and saturation positioned so that at least a portion of the second color sample is directly adjacent to at least a portion of the first color sample; and
    a barrier of a known neutral color positioned directly adjacent to each of the plurality of color samples without separating the at least the portion of the second color sample from the at least the portion of the first color sample.

2. The color reference chart of claim 1, wherein the plurality of color samples includes a first set of color samples of a first saturation level and a second set of color samples of a second saturation level that is higher than the first saturation level, and each of the first color sample and the second color sample is included in one of: the first set of color samples or the second set of color samples.

3. The color reference chart of claim 2, wherein each of the first set of color samples and the second set of color samples includes one color sample for each hue of: red, green, blue, cyan, magenta, and yellow.

4. The color reference chart of claim 3, wherein most of the first set of color samples is arranged along a first row of the array, most of the second set of color samples is arranged along a second row of the array, and the barrier is positioned between the first row and the second row.

5. The color reference chart of claim 4, wherein one color sample of the first set of color samples is positioned along an edge of the array, and one color sample of the second set of color samples is positioned along an opposite edge of the array.

6. The color reference chart of claim 5, wherein the hue for each of: the one color sample of the first set of color samples and the one color sample of the second set of color samples is red.

7. The color reference chart of claim 6, wherein the first set of color samples is arranged so that a first color sample of magenta is positioned immediately adjacent to the one of the second set of color samples, a first color sample of blue is positioned immediately adjacent to the first color sample of magenta, a first color sample of cyan is positioned immediately adjacent to the first color sample of cyan, a first color sample of green is positioned immediately adjacent to the first color sample of cyan, and a first color sample of yellow is positioned immediately adjacent to the first color sample of green and the one color sample of the first set of color samples.

8. The color reference chart of claim 7, wherein the second set of color samples is arranged so that a second color sample of yellow is positioned immediately adjacent to the one of the second set of color samples, a second color sample of green is positioned immediately adjacent to the second color sample of yellow, a second color sample of cyan is positioned immediately adjacent to the second color sample of green, a second color sample of blue is positioned immediately adjacent to the second color sample of cyan, and a second color sample of magenta is positioned immediately adjacent to the second color sample of blue and the one color sample of the first set of color samples.

9. The color reference chart of claim 8, wherein the barrier comprises a first partition of a first neutral color and a second partition of a second neutral color positioned immediately adjacent to the first partition.

10. The color reference chart of claim 4, wherein one color sample of the first set of color samples and one color sample of the second set of color samples are positioned along a first edge of the array, and the one color sample of the first set of color samples and the one color sample of the second set of color samples are also positioned along an opposite second edge of the array.

11. The color reference chart of claim 10, wherein the hue for each of: the one color sample of the first set of color samples and the one color sample of the second set of color samples is yellow, and wherein the one color sample of the first set of color samples and the one color sample of the second set of color samples are positioned directly adjacent to each other along each of the first edge and the second edge.

12. The color reference chart of claim 11, wherein the first set of color samples is arranged so that a first color sample of magenta is positioned immediately adjacent to the one of the first set of color samples positioned along the first edge of the array, a first color sample of cyan is positioned immediately adjacent to the first color sample of magenta, a first color sample of blue is positioned immediately adjacent to the first color sample of cyan, a first color sample of green is positioned immediately adjacent to the first color sample of blue, and a first color sample of red is positioned immediately adjacent to the first color sample of green and the one color sample of the first set of color samples that is positioned along the second edge of the array.

13. The color reference chart of claim 12, wherein the second set of color samples is arranged so that a second color sample of red is positioned immediately adjacent to the one of the second set of color samples positioned along the first edge of the array, a second color sample of magenta is positioned immediately adjacent to the second color sample of red, a second color sample of blue is positioned immediately adjacent to the second color sample of magenta, a second color sample of cyan is positioned immediately adjacent to the second color sample of blue, and a second color sample of green is positioned immediately adjacent to the second color sample of cyan and the one color sample of the first set of color samples positioned along the second edge of the array.

14. The color reference chart of claim 13, wherein the barrier comprises a first partition of a first neutral color and a second partition of a second neutral color positioned immediately adjacent to the first partition.

15. The color reference chart of claim 1, wherein all color samples of the plurality of color samples are of a same saturation level.

16. The color reference chart of claim 15, wherein the array comprises a plurality of columns, and wherein each column of the plurality of columns contains one color sample of the plurality of color samples and one portion of the barrier.

17. The color reference chart of claim 16, wherein within each column of the plurality of columns an area of a corresponding color sample of the plurality of color samples is greater than an area of a corresponding portion of the barrier.

18. The color reference chart of claim 17, wherein areas of color samples of the plurality of color samples that are contained in a first column and a last column of the plurality of columns are smaller than areas of color samples of the plurality of color samples that are contained within columns of the plurality of columns positioned between the first column and the last column.

19. A color reference chart for evaluating a chrominance signal of a video image, the color reference chart comprising:
a first edge color sample extending along an entirety of a first edge of an array, wherein the first edge color sample comprises a red color sample of a first known saturation level;
a second edge color sample extending along an entirety of a second edge of the array opposite the first edge, wherein the second edge color sample comprises a red color sample of a second known saturation level that is higher than the first known saturation level;
a first row positioned between the first edge color sample and the second edge color sample and containing a first plurality of color samples of the first known saturation level, wherein the first plurality of color samples comprises: a first magenta color sample positioned directly adjacent to the first edge color sample, a first blue color sample positioned directly adjacent to the first magenta color sample, a first cyan color sample positioned directly adjacent to the first blue color sample, a first green color sample positioned directly adjacent to the first cyan color sample, and a first yellow color sample positioned directly adjacent to the first green color sample and the second edge color sample;
a second row positioned between the first edge color sample and the second edge color sample and containing a second plurality of color samples of the second known saturation level, wherein the second plurality of color samples comprises: a second yellow color sample positioned directly adjacent to the first edge color sample, a second green color sample positioned directly adjacent to the second yellow color sample, a second cyan color sample positioned directly adjacent to the second green color sample, a second blue color sample positioned directly adjacent to the second cyan color sample, and a second magenta color sample positioned directly adjacent to the second blue color sample and the second edge color sample; and
a barrier positioned between the first row and the second row, wherein the barrier contains a first partition of a first neutral color positioned directly adjacent to a second partition of a second neutral color.

20. A method comprising:
capturing, by a processing system including at least one processor, a frame of a digital image, where the frame contains a color reference chart that contains a first non-neutral color sample and a second non-neutral color sample positioned adjacent to each other, without a barrier of a neutral color separating the first color sample and the second color sample;
comparing, by the processing system, an appearance of a pattern created by the color reference chart in the frame using a video vectorscope to an expected appearance of the pattern;
determining, by the processing system in response to the appearance of the pattern, that a color value of a video signal should be adjusted; and
adjusting, by the processing system, the color value of the video signal until the appearance of the pattern when viewed using the video vectorscope matches the expected appearance of the pattern.

* * * * *